Oct. 20, 1964 J. R. TOMLINSON 3,153,694

ENCAPSULATION OF ELECTRONIC CIRCUITS

Filed June 2, 1959

INVENTOR
JOSEPH R. TOMLINSON

BY John F. Holzmann
ATTORNEY

United States Patent Office 3,153,694

Patented Oct. 20, 1964

3,153,694
ENCAPSULATION OF ELECTRONIC CIRCUITS

Joseph R. Tomlinson, Rocky River, Ohio, assignor, by mesne assignments, to the United States of America as represented by the Secretary of the Army Filed June 2, 1959, Ser. No. 817,665
4 Claims. (Cl. 174—52)

This invention relates to the encapsulation of an electronic circuit in a protective medium, and more particularly, to the encapsulation of an electronic circuit in polyurethane resin.

Polyurethane resins have been known for some time to the chemical industry. These resins are generally made by reacting a diisocyanate with an organic compound containing at least two hydroxyl groups per molecule, as for example, a glycol. This resin may be conveniently foamed by adding water to an excess of the diisocyanate. The foaming action may be catalyzed by the introduction of a tertiary aliphatic amine into the reaction mixture. The foam thus produced may be rigid, semi-rigid, or flexible, depending upon the amounts of various components employed. A cross-linking agent, such as polypropylene oxide, for example, is generally used to increase the stiffness of the foam.

The principal object of the invention is to provide an improved encapsulated and protected electronic circuit. Broadly stated, this object is accomplished by disposing an electronic circuit in an open top container, and dispensing a predetermined amount of a foam-in-place polyurethane resin formulation of the closed pore, rigid type around the electronic circuit. If desired the container may be capped during the foaming period and until the foam is sufficiently hardened.

The term "electronic circuit" as used herein and in the appended claims refers to any of the various electrical components which may be used in an electrical circuit along with their connecting leads.

Figure 1:
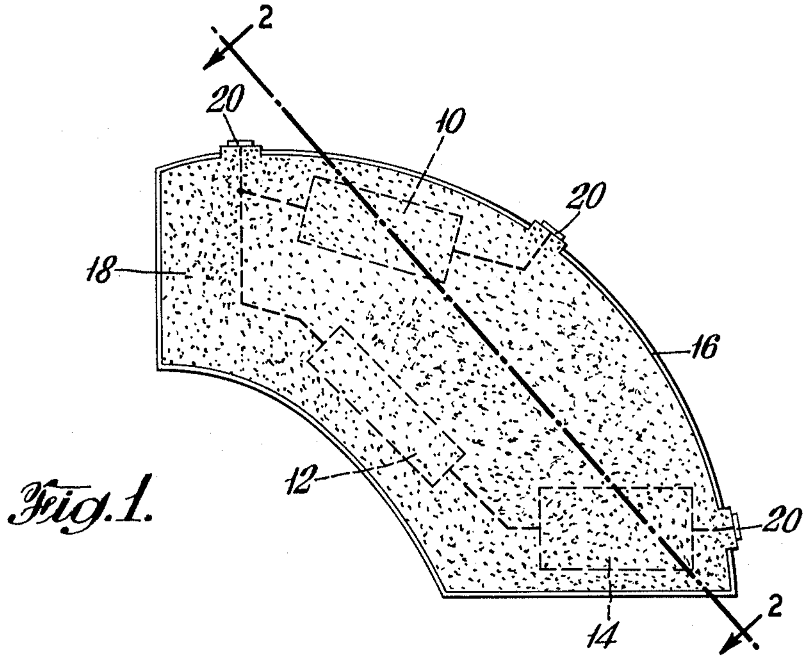
Figure 2:
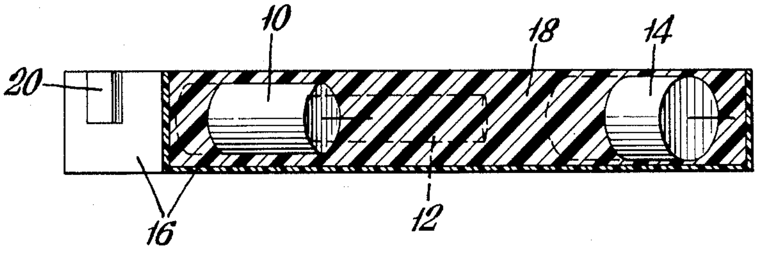

The invention will be more readily understood by reference to the accompanying drawing, wherein:

FIG. 1 is a plan view of an electronic circuit which has been encapsulated according to the principles of the invention; and FIG. 2 is a section view along line 2—2 of the encapsulated electronic circuit of FIG. 1.

The invention resides in the discovery that a polyurethane foam-in-place resin of the closed pore, rigid type is an excellent encapsulating material for electronic circuits, such as RC circuits, i.e., a capacitor, a resistor, and a primary cell. Such resins as an encapsulating material for an electronic circuit, in addition to having high moisture resistance and low moisture absorption has many other desirable properties, including a low power factor and low dielectric constants, an excellent strength to density ratio, good thermo-insulation, good oil resistance, good fungus resistance, good temperature resistance, good machinability, and they are non-friable. Moreover, such foams adhere tenaciously to surfaces such as wood, fiber glass, laminates, primed metals and fabrics.

A particular resin formulation which will give a satisfactory closed pore, rigid type foam which may be used successfully in the practice of the invention is as follows:

A mixture comprising 100 parts by weight of a highly-branched polyester, derived from the reaction of adipic acid and a mixture of triols which has a free hydroxyl number of 350 to 550, such as the product marketed by Witco Chemical Company under the product designation "Foamrez R–400"; 0.3 part by weight of a silicone resin, such as described in U.S. Patent No. 2,834,748, and as marketed by Union Carbide Corporation under the product designation of "XL 520 Silicone Compound"; 0.5 part by weight water; 0.25 part by weight anhydrous dimethylaminoethanol; and 100 parts by weight of a prepolymer composed of the reaction product of the polyester above disclosed (Foamrez R–400) and toluene diisocyanate having 34.2% free isocyanate functional groups. This polyurethane foam-in-place resin formulation is thermo-setting and requires no post curing.

Referring now to the drawing, an electronic circuit may be encapsulated as follows: a capacitor 10, a resistor 12, and a primary cell 14 which comprise an RC electronic circuit is disposed within a thin walled container 16, suitably of glass filled polystyrene, and a predetermined amount of the above discussed foam-in-place polyurethane resin formulation is dispensed into the container 16 around the RC circuit, where it will foam-in-place. The foamed resin 18 which has a surface resistivity in excess of $1 \times 10^{12}$ ohms at room temperature, adheres tenaciously to the inner surface of the polystyrene container 16 and to the electrical connecting terminals 20 and seals out moisture. This insures a high electrical resistance between the external connecting terminals 20 of the encapsulated circuit. Preferably, to obtain the maximum electrical insulation benefit from the foamed polyurethane resin 18, the terminals 20 should not be in direct contact with the container 16, but should be spaced therefrom, suitably as shown in the drawing. For certain applications where a relatively high density foam of the closed pore rigid type is desired, the top of the container 16 may be capped during the time the foaming action is taking place, and until the foam 18 is sufficiently hardened. In this embodiment, a foam density of above 14 pounds per cubic foot will be realized and the foam will have an extremely low water absorption rate due to the smooth exterior surface which it presents.

The advantages of the invention may be summarized as follows:

(1) The encapsulation of an electronic circuit with a polyurethane foam of the closed pore, rigid type which has a high surface resistivity at room temperature in excess of $1 \times 10^{12}$ ohms, reduces external leakage currents of the encapsulated capacitor and reduces the effect of parallel circuits caused by the encapsulating material. This high surface resistivity is maintained above $1 \times 10^9$ ohms over a temperature range of from −80° F. to 160° F. at humidities as high as 95 to 100 percent relative humidity.

(2) The closed pore, rigid type polyurethane foam which is used for encapsulating the circuit adheres tenaciously to the polystyrene container that is used and to the lead wires to the RC circuit and therefore provides an excellent seal which prevents moisture from creeping or seeping into the encapsulated circuit. The presence of any moisture, even in trace amounts, would unbalance the RC circuit. This seal effectiveness is maintained even after prolonged storage at any temperature over the range of −80° F. to 160° F.

(3) The polyurethane foam of the closed pore rigid type that is used to encapsulate the circuit has sufficient elastomeric properties to permit the encapsulated components to expand or contract as they are cycled between −80° and 160° F., 95 percent relative humidity, without any deleterious effect on the desirable foam properties.

(4) An electronic circuit which has been encapsulated according to the principles of the invention will withstand severe shock and vibration without any deleterious effect on the encapsulated components.

What is claimed is:

1. An encapsulated electronic circuit, composed of an electronic circuit embedded in a resin foam of the closed pore type, wherein said resin foam comprises, by weight, about 100 parts of a polyester reaction product of adipic acid and triols, 0.3 part of silicone resin, 0.5 part of water, 0.25 part of anhydrous dimethylaminoethanol, and 100 parts of a polyester reaction product of toluene diisocyanate, adipic acid, and triols.

2. An encapsulated electronic circuit according to claim 1, the said foamed resin sealing said electronic circuit from ambient moisture and having a surface resistivity in excess of $1 \times 10^9$ ohms at temperatures of $-80°$ F. to $160°$ F.

3. An encapsulated electronic circuit according to claim 2 wherein said resin foam has a surface resistivity of about $1 \times 10^{12}$ ohms at room temperature.

4. The encapsulated electronic circuit of claim 1 wherein said foamed polyurethane resin has a foam density of about 14 pounds per cubic foot.

References Cited in the file of this patent

UNITED STATES PATENTS

| | | |
|---|---|---|
| 2,466,271 | Pfluemer | Apr. 5, 1949 |
| 2,814,666 | Maddox | Nov. 26, 1957 |

OTHER REFERENCES

Polyurethanes by Dombrow, published by Reinhold Publishing Corporation, copyright 1947, pp. 29–37 and 47.

Electronics: June 1950; pages 66–69.

Radio and Television News; vol. 44, No. 6, December 1950, pages 6A, 7A, 8A, 27A.

Modern Plastics: April 1953; pages 85–87.